United States Patent
Kuchenski et al.

(10) Patent No.: US 11,037,114 B2
(45) Date of Patent: Jun. 15, 2021

(54) SYSTEM AND METHOD FOR FINANCIAL TRANSACTIONS

(71) Applicant: Diebold Nixdorf, Incorporated, North Canton, OH (US)

(72) Inventors: David William Kuchenski, Tallmadge, OH (US); Richard Harris, Southampton (GB); Robert Konecny, Uniontown, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 63 days.

(21) Appl. No.: 16/235,326

(22) Filed: Dec. 28, 2018

(65) Prior Publication Data

US 2019/0295055 A1    Sep. 26, 2019

Related U.S. Application Data

(60) Provisional application No. 62/646,640, filed on Mar. 22, 2018.

(51) Int. Cl.
    *G06F 21/57* (2013.01)
    *G06F 21/85* (2013.01)
    (Continued)

(52) U.S. Cl.
    CPC ..... *G06Q 20/1085* (2013.01); *G06Q 20/3223* (2013.01); *G07F 19/203* (2013.01); *G07F 19/211* (2013.01)

(58) Field of Classification Search
    CPC ............ G06Q 20/1085; G06Q 20/3223; G07F 19/211; G07F 19/203
    (Continued)

(56) References Cited

U.S. PATENT DOCUMENTS

| 5,650,604 A | 7/1997 | Marcous et al. |
| 5,963,647 A | 10/1999 | Downing et al. |

(Continued)

FOREIGN PATENT DOCUMENTS

| CA | 2612618 C | 8/2013 |
| DE | 19964080 A1 | 12/2001 |

(Continued)

OTHER PUBLICATIONS

International Search Report and Written Opinion filed in the corresponding PCT application; 13 pages.

*Primary Examiner* — Hai Tran

(74) *Attorney, Agent, or Firm* — Black, McCuskey, Souers & Arbaugh LPA

(57) ABSTRACT

A financial transaction computing system can include an ATM and a prestaging module. The ATM can have one or more processors, a first transceiver, one or more cash cassettes, a slot exposed on an exterior of the ATM and communicating with the one or more cash cassettes, and a banknote dispensing module at least configured to move banknotes from the one or more cash cassettes to the slot. The pre-staging module can have one or more processors, a first memory, and a second transceiver. The pre-staging module can also be configured to communicate with the ATM over a wireless public network to receive a token from the ATM over the wireless public network. The pre-staging module can be configured to retrieve a pre-staged transaction from the first memory in response to receiving the token from the ATM.

17 Claims, 4 Drawing Sheets

(51) Int. Cl.
*G06Q 20/10* (2012.01)
*G07F 19/00* (2006.01)
*G06Q 20/32* (2012.01)

(58) Field of Classification Search
USPC .......................................................... 705/43
See application file for complete search history.

(56) References Cited

U.S. PATENT DOCUMENTS

| | | | |
|---|---|---|---|
| 6,112,078 | A | 8/2000 | Sormunen et al. |
| 6,782,080 | B2 | 8/2004 | Leivo |
| 7,437,331 | B1 | 10/2008 | Rosenberger |
| 7,478,065 | B1 | 1/2009 | Ritter et al. |
| 7,697,942 | B2 | 4/2010 | Stevens |
| 7,748,617 | B2 | 7/2010 | Gray |
| 7,756,748 | B2 | 7/2010 | Shaked |
| 8,510,319 | B2 | 8/2013 | Kalnes |
| 8,538,845 | B2 | 9/2013 | Liberty |
| 8,935,226 | B2 | 1/2015 | Stevens |
| 9,002,814 | B2 | 4/2015 | Stevens |
| 9,160,741 | B2 | 10/2015 | Wentker et al. |
| 9,208,488 | B2 | 12/2015 | Liberty |
| 9,367,837 | B2 | 6/2016 | Martin et al. |
| 9,578,500 | B1 | 2/2017 | Yeduvakula |
| 10,438,196 | B2 | 10/2019 | Liberty |
| 2002/0069170 | A1 | 6/2002 | Rizzo et al. |
| 2003/0126083 | A1 | 7/2003 | Ritter et al. |
| 2004/0243518 | A1 | 12/2004 | Clifton |
| 2009/0078758 | A1 | 3/2009 | Crowell |
| 2009/0281904 | A1 | 11/2009 | Pharris |
| 2009/0319360 | A1 | 12/2009 | Salemi |
| 2010/0153249 | A1 | 6/2010 | Yuan et al. |
| 2011/0313924 | A1 | 12/2011 | Carell et al. |
| 2012/0047070 | A1 | 2/2012 | Pharris |
| 2012/0089514 | A1 | 4/2012 | Kraemling |
| 2014/0019336 | A1* | 1/2014 | Browne .................. G06Q 40/02 705/39 |
| 2016/0026991 | A1 | 1/2016 | Murdoch et al. |
| 2017/0308883 | A1* | 10/2017 | Black ................... G06Q 20/206 |

FOREIGN PATENT DOCUMENTS

| | | |
|---|---|---|
| DE | 102005050605 A1 | 5/2007 |
| DE | 102008011192 A1 | 8/2009 |
| EP | 100137 B | 9/1997 |
| EP | 0884703 A2 | 12/1998 |
| EP | 0794651 B1 | 7/2003 |
| EP | 1615097 B1 | 5/2008 |
| EP | 1956541 A1 | 8/2008 |
| EP | 2528045 A1 | 11/2012 |
| EP | 2797058 A1 | 10/2014 |
| ES | 2284696 T3 | 11/2007 |
| ES | 2319722 T3 | 5/2009 |
| FI | 945075 A | 4/1996 |
| JP | 0746323 A | 2/1995 |
| JP | 2005216250 A | 8/2005 |
| KR | 100904908 B1 | 6/2009 |
| RU | 2116008 C1 | 7/1998 |
| WO | 2000067177 A2 | 11/2000 |
| WO | 2006106405 A | 10/2006 |
| WO | 2009106530 A1 | 9/2009 |
| WO | 2010147559 A8 | 12/2010 |
| WO | 2011148096 A1 | 12/2011 |
| WO | 2012003842 A1 | 1/2012 |
| WO | 2015157460 A1 | 10/2015 |
| WO | 2016100965 A1 | 6/2016 |
| WO | 2017062810 A1 | 4/2017 |

* cited by examiner

SYSTEM AND METHOD FOR FINANCIAL TRANSACTIONS

CROSS-REFERENCE TO RELATED APPLICATIONS

This application claims the benefit of U.S. Provisional Patent Application Ser. No. 62/646,640, filed on Mar. 22, 2018, which is hereby incorporated by reference in its entirety.

BACKGROUND

1. Field

The present disclosure relates to financial transaction computing systems.

2. Description of Related Prior Art

Banking transactions requested by a customer may be processed in different ways. For example, a banking customer may visit a teller and the teller may process the banking transaction. Alternatively, the customer may use an automated transaction machine (ATM) to process a banking transaction.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A financial transaction computing system can include an ATM and a prestaging module. The ATM can have one or more processors, a first transceiver, one or more cash cassettes, a slot exposed on an exterior of the ATM and communicating with the one or more cash cassettes, and a banknote dispensing module at least configured to move banknotes from the one or more cash cassettes to the slot. The first transceiver can be configured to transmit and receive communications over at least a wireless public network. The ATM can be configured to be engaged by a user to request at least one financial transaction. The ATM can also be configured to receive a token from the user as the request for the at least one financial transaction. The ATM can also be configured to transmit the token over the wireless public network in response to receipt of the token from the user. The pre-staging module can have one or more processors, a first memory, and a second transceiver. The second transceiver can be configured to transmit and receive communications over the wireless public network. The pre-staging module can be configured to store a pre-staged transaction in the first memory. The at least one financial transaction requested by the user corresponds to the pre-staged transaction. The token can correlate the requested, at least one financial transaction and the pre-staged transaction. The pre-staging module can also be configured to communicate with the ATM over the wireless public network and receive the token from the ATM over the wireless public network. The pre-staging module can also be configured to retrieve the pre-staged transaction from the first memory in response to receiving the token from the ATM over the wireless public network. The pre-staging module can also be configured to generate and selectively transmit an execution directive over the wireless public network to the ATM in response to retrieving the pre-staged transaction from the first memory. The execution directive corresponds to the at least one financial transaction requested by the user. The ATM can be further configured to execute the at least one financial transaction in response to receiving the execution directive from the pre-staging module.

According to other features, the financial transaction computing system can also include a remote services module having one or more processors and a third transceiver. The remote services module can be configured to receive the pre-staged transaction from a computing device possessed by a user over a public network. The remote services module can also be configured to transmit the token outside of the private network.

In other features, the financial transaction computing system can also include a queuing services module and a financial institution core. The queuing services module can having one or more processors, a second memory, and a fourth transceiver. The queuing services module can be configured to receive the pre-staged transaction from the remote services module and generate a token associated with the pre-staged transaction. The financial institution core can have one or more processors, a third memory, and a fifth transceiver. The third memory can store a primary ledger of an account associated with the user and transactions associated with the account. The fourth transceiver can be configured to exchange communications with the queuing services module over a private network distinct from the wireless public network.

A method of operating a financial transaction computing system can include receiving, with a remote services module, a first input from a computing device possessed by a user. The remote services module can be physically remote from the computing device. The first input can define a pre-staged financial transaction and at least include details of an account associated with the user and an amount to be withdrawn from the account. The method of operating a financial transaction computing system can also include transmitting, with the remote services module, over a private network, the first input to a financial institution core having a first memory. The first memory can store a ledger of the account and prior transactions associated with the account. The method of operating a financial transaction computing system can also include determining, with the financial institution core, that the pre-staged financial transaction is approved. The method of operating a financial transaction computing system can also include generating, with a queuing services module after the determining, a token corresponding to the first input. The method of operating a financial transaction computing system can also include transmitting, with the queuing services module, at least the amount to be withdrawn of the first input and the token to a pre-staging module having a second memory. The method of operating a financial transaction computing system can also include storing, with the pre-staging module, in the second memory, the at least the amount to be withdrawn of the first input and the token. The method of operating a financial transaction computing system can also include transmitting, with the remote services module, the token outside of the private network. The method of operating a financial transaction computing system can also include receiving, with the pre-staging module, the token from an automated transaction machine (ATM), after the transmitting the token outside of the private network with the remote services module. The method of operating a financial transaction computing system can also include retrieving, with the pre-staging module, the at least the amount to be withdrawn of the first input from the second memory in response to receiving the token. The method of operating a financial transaction computing system can also include transmitting, with the pre-staging module, the at least the amount to be withdrawn of the first input to the ATM. The method of operating a financial transaction computing system can also include dispensing, with the ATM, currency in the amount to be withdrawn from the account in response to the transmitting the at least the amount to be withdrawn by the pre-staging module.

According to additional features, the method can also include receiving, with the ATM, the token after the transmitting the token outside of the private network and before the receiving the token with the pre-staging module. The method can also include transmitting, with the ATM, the token to the pre-staging module after the receiving the token with the ATM and before the receiving the token with the pre-staging module. The dispensing can be further defined as: dispensing, with the ATM, the currency in response to the receiving the token and to the transmitting the at least the amount to be withdrawn by the pre-staging module, without receiving either of additional information related to the pre-staged transaction and an identity of a person presenting the token to the ATM.

According to other features, the transmitting the at least the amount to be withdrawn with the pre-staging module can be further defined as: transmitting, with the pre-staging module outside of the private network, only the amount to be withdrawn of the first input to the ATM. Alternatively, the transmitting the at least the amount to be withdrawn of the first input and the token to the pre-staging module with the queuing services module can be further defined as: transmitting, with the queuing services module, only the amount to be withdrawn and the token to the pre-staging module.

In other features, the generating the token with the queuing services module can further comprise: correlating, with the queuing services module, the token with the account associated with the user and retaining, with the queuing services module, the correlation between the token and the account from the pre-staging module. The retaining can be further defined as: retaining, with the queuing services module, the correlation between the token and the account from the pre-staging module and from the private network.

According to additional features, the method can further include storing, in the first memory, the first input as a provisional transaction against the account. The method can further include transmitting, with the financial core over the private network, the provisional transaction to the queuing services module. The queuing services module can execute the generating in response to the transmitting the provisional transaction by the financial core over the private network.

According to other features, the method can further comprise: receiving, at the pre-staging module, from outside private network, a second input from the ATM indicating completion of the dispensing. The method can further comprise: transmitting, with the pre-staging module, over one of the private network and a virtual private network, the second input and the token to the queuing services module. The method can further comprise: correlating, with the queuing services module, the token to the account. The method can further comprise: transmitting, with the queuing services module, over the private network, the second input and the account to the financial core. The method can further comprise: converting, with the financial core, the provisional transaction to a completed transaction in response to receiving the account and the second input.

In other features, the receiving the first input from the computing device possessed by the user can be further defined as: receiving, with the remote services module, the first input over a first public network. The transmitting the at least the amount to be withdrawn of the first input and the token to the pre-staging module can be further defined as: transmitting, with the queuing services module, at least the amount to be withdrawn of the first input and the token to the pre-staging module over a virtual private network. Alternatively, the transmitting the at least the amount to be withdrawn of the first input and the token to the pre-staging module can be further defined as: transmitting, with the queuing services module, at least the amount to be withdrawn of the first input and the token to the pre-staging module over a second public network. The receiving the token with the pre-staging module can be further defined as: receiving, with the pre-staging module, the token from the ATM over a third public network. The transmitting the at least the amount to be withdrawn of the first input to the ATM can be further defined as: transmitting, with the pre-staging module, the at least the amount to be withdrawn of the first input to the ATM over the first public network.

According to additional features, the method can further comprise: generating, with the queuing services module, a one-time personal identification number (OTPIN) after the determining, corresponding to the first input, and distinct from the token. The method can further comprise: transmitting, with the queuing services module, the OTPIN to the pre-staging module with the at least the amount to be withdrawn of the first input and the token. The method can further comprise: storing, in the second memory, the OTPIN with the at least the amount to be withdrawn of the first input and the token. The method can further comprise: transmitting, with the remote services module, the OTPIN outside of the private network separately from the token. The method can further comprise: receiving, with the pre-staging module, the OTPIN from outside of the private network with the token, from the ATM, after the transmitting the OTPIN outside of the private network. The method can further comprise: retrieving, with the pre-staging module, the at least the amount to be withdrawn of the first input from the second memory in response to receiving the token and the OTPIN. The transmitting of the OTPIN outside of the private network can be further defined as transmitting, with the remote services module, the OTPIN outside of the private network in first of an email message and a text message. The transmitting of the token outside of the private network can be further defined as transmitting, with the remote services module, the token outside of the private network in a second of an email message and a text message, the second opposite of the first.

According to other features, the method can further comprise: determining, with the pre-staging module, a first time period between the transmitting the at least the amount to be withdrawn of the first input and the token to the pre-staging module and the receiving the token from outside of the private network with the pre-staging module. The method can further comprise: comparing, with the pre-staging module, the first time period to a predetermined time period. The transmitting the at least the amount to be withdraw to the ATM is further defined as: transmitting, with the pre-staging module, the at least the amount to be withdrawn of the first input to the ATM only if the first time period is less than the predetermined time period. The transmitting the token outside of the private network can be further defined as:

transmitting, with the remote services module, the token outside of the private network in one of an email message and a text message.

A method of operating a financial transaction computing system can include receiving, at a pre-staging module having one or more processors and a first memory, a first input, over one of a first public network and a first virtual private network, from a first financial institution, the first input including at least a first amount of a withdrawal and a first token. The method of operating a financial transaction computing system can also include storing, in the first memory, the first input and the first token. The method of operating a financial transaction computing system can also receiving, with the pre-staging module, the first token over a public network from a first automated transaction machine (ATM), after the storing. The method of operating a financial transaction computing system can also retrieving, from first memory with the pre-staging module, the first amount of the withdrawal in response at least in part to receiving the first token. The method of operating a financial transaction computing system can also transmitting, with the pre-staging module, the first amount of the withdrawal to the first ATM. The method of operating a financial transaction computing system can also receiving, at a pre-staging module having one or more processors and a second memory, a second input, over one of the first public network or a second public network distinct from the first public network or a second virtual private network distinct from the first virtual private network, from a second financial institution, the second input including at least a second amount of a withdrawal and a second token. The method of operating a financial transaction computing system can also storing, in the second memory, the second input and the second token. The method of operating a financial transaction computing system can also receiving, with the pre-staging module, the second token over a public network from a second automated transaction machine (ATM), after the storing. The method of operating a financial transaction computing system can also retrieving, from second memory with the pre-staging module, the second amount of the withdrawal in response at least in part to receiving the second token. The method of operating a financial transaction computing system can also transmitting, with the pre-staging module, the second amount of the withdrawal to the second ATM.

BRIEF DESCRIPTION OF THE DRAWINGS

The detailed description set forth below references the following drawings.

DETAILED DESCRIPTION

The present disclosure, as demonstrated by the exemplary embodiment described below, can provide technological improvements to dispensing tangible, physical currency with financial transaction computing systems. The improvement is not applicable to actions performed by human tellers and is not performable by humans. The solution enhances the efficiency of financial transactions systems which include a plurality of computing devices. The solution provides objectively demonstrable benefits to users.

Financial transactions systems include legacy systems that often cannot be circumvented or feasibly replaced. Requests for financial transactions must pass through various security protocols to prevent various forms of fraudulent activity. Each application of a security protocol increases the time required to complete a requested financial transaction. Further, the requirements imposed by legacy systems must be met unless the legacy system is replaced.

The present disclosure provides an improvement to existing financial transactions systems which reduces the time required for completion of a requested financial transaction. A system according to the present disclosure designates new pathways for requested financial transactions which utilize various levels of security to increase speed and efficiency. A network with relatively greater security protocols can be utilized to receive, assess, and provisionally-approve transactions. A network with less security protocols can be utilized in the execution and completion of the provisionally-approved transactions. This reduces the time required to complete the transaction. It also allows transactions to be initiated and completed in different geographic locations. Further, it allows a financial institution to "off-load" a portion of the transaction protocol and thereby lower its own architecture burden. This also avoids having to replace legacy systems. Further, the present disclosure system can also obviate current systems for transferring funds to others, which typically charge a fee.

Figure 1:
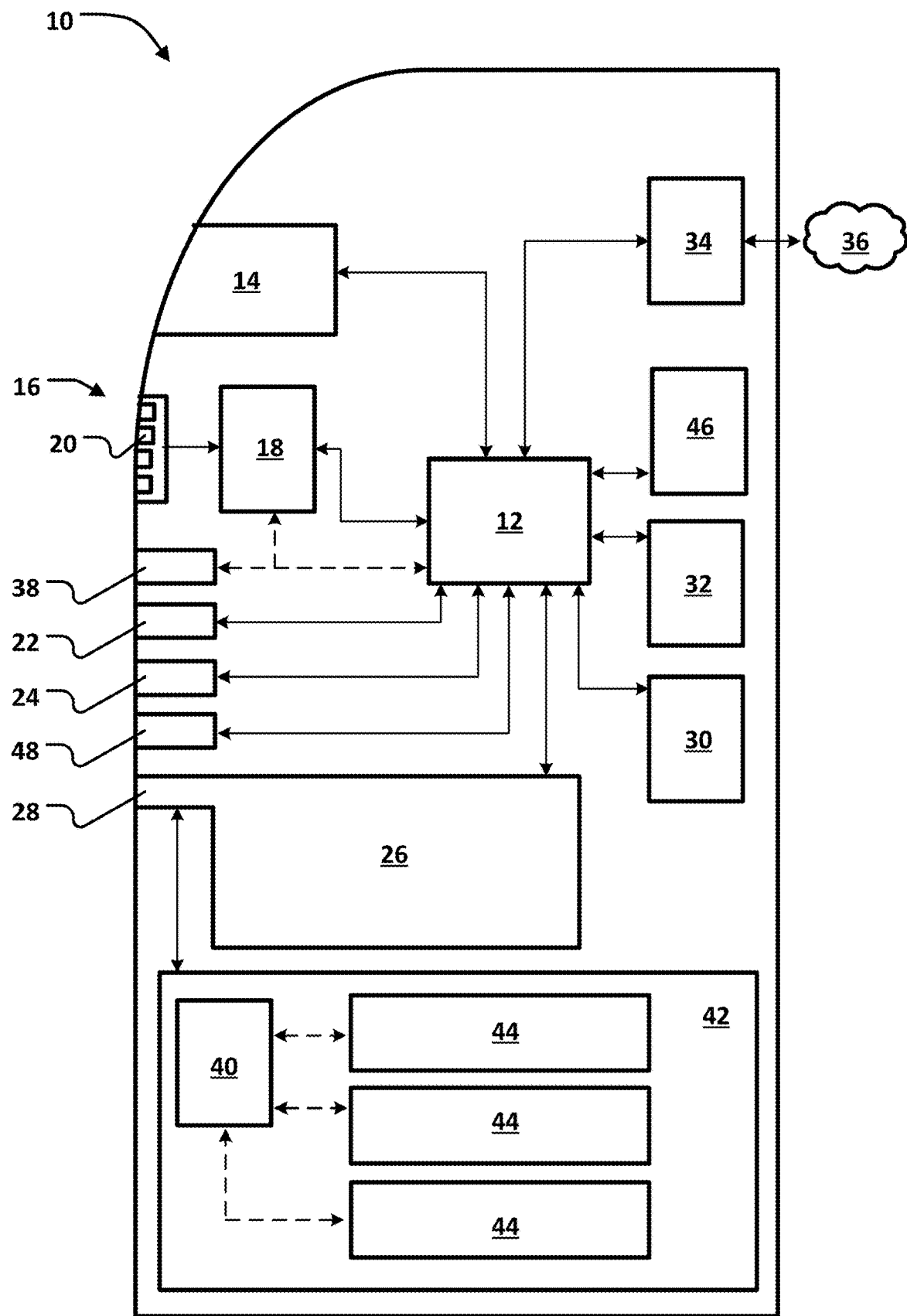
FIG. 1 is a functional block diagram of an exemplary ATM according to one or more implementations of the present disclosure.

Referring now to the drawings, FIG. 1 discloses a functional block diagram of an exemplary ATM 10 according to one or more implementations of the present disclosure. The ATM 10 includes different structures and subsystems for receiving input from a user and executing transactions. The ATM 10 includes a computing device 12. The exemplary computing device 12 has one or more processors and a non-transitory, computer readable medium. The computing device 12 operates under the control of an operating system, kernel and/or firmware and executes or otherwise relies upon various computer software applications, components, programs, objects, modules, data structures, etc. The exemplary computing device 12 can operate under the control of the Windows® operating system. The computer readable medium (memory) of the computing device 12 can include random access memory (RAM) devices comprising the main storage of computing device 12, as well as any supplemental levels of memory, e.g., cache memories, non-volatile or backup memories (e.g., programmable or flash memories), read-only memories, etc. In addition, the memory may be considered to include memory storage physically located elsewhere from RAM in the computing device 12, such as any cache memory in a processor, as well as any storage capacity used as a virtual memory. The computing device 12 can also include one or more mass storage devices, e.g., a floppy or other removable disk drive, a hard disk drive, a direct access storage device (DASD), an optical drive (e.g., a CD drive, a DVD drive, etc.), and/or a tape drive, among others, represented by memory 46.

The exemplary ATM 10 also includes a display 14. The computing device 12 can control the display 14 to present information to the user for furthering completion of the transaction. The display 14 can be a touch screen that allows the user to enter information through the display 14. The exemplary display 14 is configured to transmit any user-entered information to the computing device 12.

The exemplary ATM 10 also includes a key pad 16 and an encryption module 18. Generally, the combination of a key pad and an encryption module are referred to in the art as an encrypted pin pad (EPP). The exemplary key pad 16 includes a plurality of keys, such as key 20. The exemplary encryption module 18 has one or more processors and a non-transitory, computer readable medium. The user can press the keys of the key pad 16 to enter a pin. The key pad 16 is placed in communication with the encryption module 18 and therefore the numbers of the pin are received by the encryption module 18. It is noted that the communication of the pin is direct and secure; the pin cannot be intercepted between the key pad 16 and the encryption module 18. The pin is then encrypted by the encryption module 18 to define a pin block. The encryption module 18 includes a network encryption key and applies the network encryption key to encrypt the pin to the pin block. The exemplary encryption module 18 is configured to transmit the pin block to the computing device 12, which can direct the pin block away from the ATM 10 during completion of a financial transaction.

The exemplary ATM 10 also includes a card reader 22. The card reader 22 can receive a token from the user, such as a card. The card reader 22 can be configured to execute read and write operations with respect to any storage medium fixed to the user's card. The exemplary card reader 22 is configured to transmit any data read from the user's card to the computing device 12, which can direct the data read from the card away from the ATM 10 during completion of a financial transaction. The exemplary card reader 22 can also be configured to receive commands and data from the computing device 12 and change data stored on the user's card.

The exemplary ATM 10 also includes a printer module 24. The computing device 12 can control the printer module 24 to print a receipt when a transaction has been completed. The printer module 24 can communicate one or more messages to the computing device 12, such as a maintenance message regarding the need to refill printer paper.

The exemplary ATM 10 also includes an article exchange unit 26. In the exemplary embodiment, the article exchange unit 26 is configured to receive items such as checks. An exemplary article exchange unit 26 can include a drum on which received items are stored. The exemplary article exchange unit 26 includes a slot 28 defined on an exterior of the ATM 10 for the passage of such items. In other embodiments of the present disclosure, an article exchange unit can be configured to facilitate the receive other items. The article exchange unit 26 can include one or more sensors and transmit signals from any such sensors to the computing device 12 to execute an exchange. The computing device 12 can control the article exchange unit 26 in response to such signals. For example, the article exchange unit 26 can include a sensor that detects receipt of an item such as a check. The article exchange unit 26 can include a further sensor in the form of a scanner that generates an image of the received item and transmits the image to the computing device 12. When an exchange involves the dispensation of an article to the user, the computing device 12 can control the article exchange unit 26 to dispense the item(s) requested by the user.

The exemplary ATM 10 also includes a printer module 30. The printer module 30 can generate a continuous record of all transactions executed by the ATM 10. The computing device 12 can control the printer module 30 to supplement the record after each transaction has been completed. The printer module 30 can communicate one or more messages to the computing device 12, such as a maintenance message regarding the need to refill printer paper.

The exemplary ATM 10 also includes an access module 32. The access module 32 can be positioned proximate to a rear side of the ATM 10. The access module 32 can be utilized for service and support technicians. For example, the access module 32 can be utilized by a field engineer to complete software updates to the computing device 12. The access module 32 can also be utilized when non-software updates and maintenance is performed, such as the refilling of printer paper or currency.

The exemplary ATM 10 also includes a transceiver 34. The exemplary transceiver 34 is configured to facilitate communication between the computing device 12 and other computing devices that are distinct from and physically remote from the computing device 12. An example of such a remote computing device is a server computing device, such as a banking or financial institution server communicating with a plurality of ATMs. The exemplary transceiver 34 places the computing device 12 in communication with one or more networks, such as network 36. The network 36 can be a local area network (LAN), a wide area network (WAN) such as the Internet, a Multi-protocol label switching (MPLS) network, a cellular network such as operated by cellular phone companies, or any combination thereof. The transceiver 34 can transmit data and requests for input generated by the computing device 12 and receive responses to these requests, directing these responses to the computing device 12.

The exemplary ATM 10 also includes a transceiver 38. The exemplary transceiver 38 is configured to facilitate communication between at least one of the encryption module 18 and the computing device 12 and other computing devices that are distinct from and physically proximate to the ATM 10. An example of such a proximate computing device is a smartphone possessed by the user. The dashed connection lines in FIG. 1 represent optional interconnections. The exemplary transceiver 38 can place the user's smartphone in communication with the encryption module 18, the computing device 12, or both. The exemplary transceiver 38 can implement various communication protocols. For example, the transceiver 38 can be a Near Field Communication (NFC) device. Alternatively, the transceiver 38 can be a Bluetooth beacon. The transceiver 38 can transmit and receive data and requests for input generated by the encryption module 18 and/or the computing device 12, such transmissions occurring with the user's smart phone for example.

The exemplary ATM 10 also includes an advanced function dispenser (AFD) 40. The AFD 40 can dispense banknotes, such as currency. The exemplary AFD 40 is positioned in a safe 42. One or more cassettes or cash boxes 44 are also positioned and protected in the safe 42. Banknotes are stored in the cassettes 44 for disbursement to a user of the ATM 10. The exemplary AFD 40 can extract the banknotes from one or more of the cassettes 44 and direct them out of the ATM 10 through the slot 28. The AFD 40 thus communicates with the slot 28 in parallel with the article exchange unit 26. The exemplary AFD 40 can communicate with and be controlled by the computing device 12. Each of the cassettes 44 can engage the AFD 40 through a rack whereby the positioning of the cassettes is controlled. Further, the each of the cassettes 44 and the AFD 40 can include mating connectors of any form, whereby a positive interconnection is confirmed electronically. When one or more of the cassettes 44 and the AFD 40 are not properly interconnected, a signal or lack thereof can be communicated to the computing device 12 whereby an error message is generated or the ATM 10 can be disabled.

The exemplary ATM 10 also includes a scanner 48. The scanner 48 can scan, for example, at least a portion of a display of a smart phone and communicate the scanned display to the computing device 12. A token can be displayed on the display of the smart phone and thus scanned by the scanner 48. The token can be a bar code, a quick response (QR) code, a number, a string of alphanumeric characters, a weblink, or some other symbolic indicia. The exemplary scanner 48 is configured to transmit any scanned data to the computing device 12, which can direct the scanned away from the ATM 10 during completion of a financial transaction.

Figure 2:
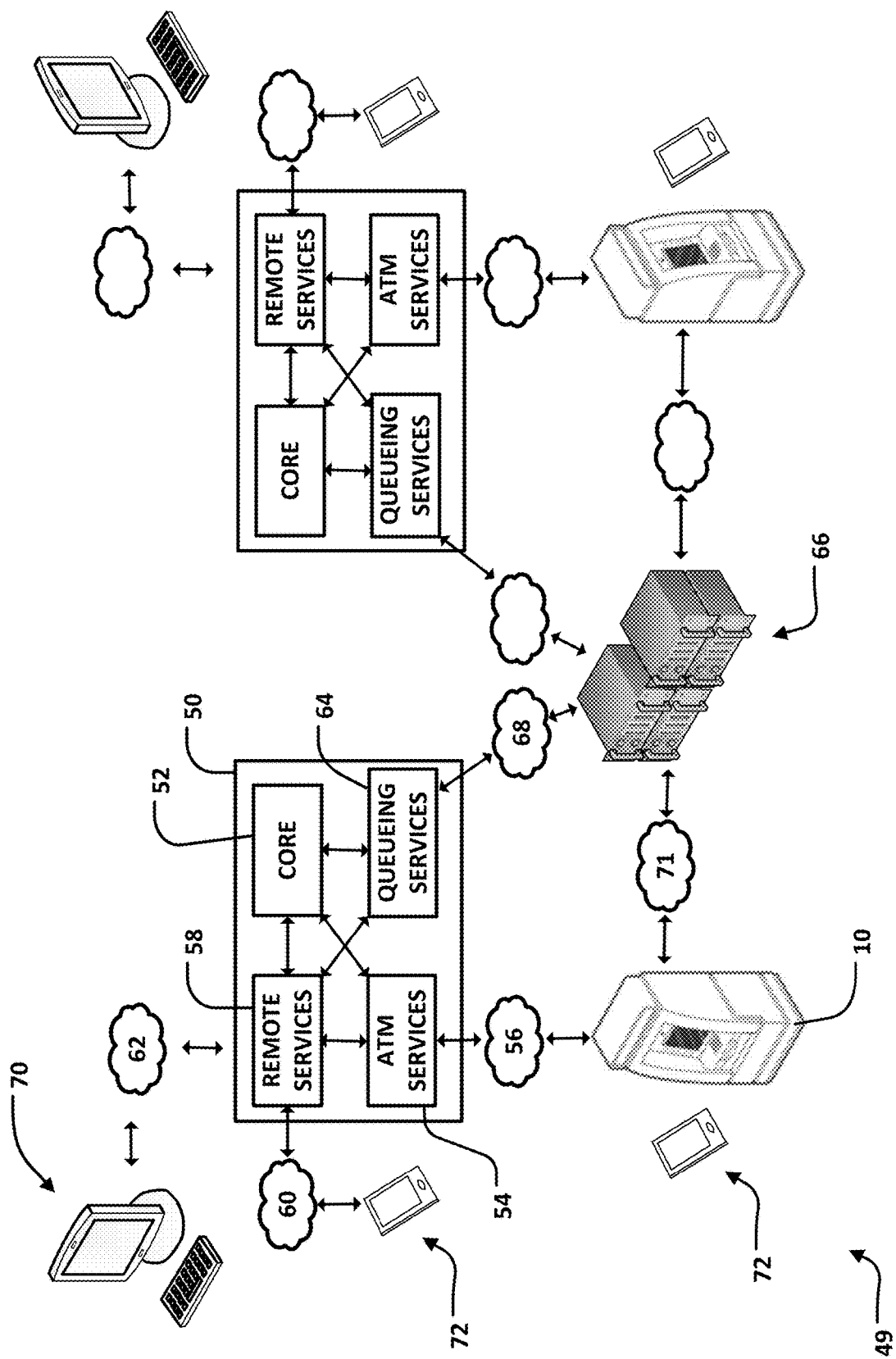
FIG. 2 is a functional block diagram of an exemplary financial transaction computing system according to one or more implementations of the present disclosure.

FIG. 2 is a functional block diagram of an exemplary financial transaction computing system according to one or more implementations of the present disclosure and referenced at 49. A financial institution can maintain a plurality of modules/components in a private network represented schematically at 50. Each module can be distinct physical component or can be a portion of an integrated server. Each module can be implemented by hardware, software, or a combination of hardware and software. A financial institution core 52 is within the exemplary private network 50. The core 52 can have one or more processors, memory, and a transceiver to communicate with other components. The memory of the core 52 can be utilized to store a primary ledger of accounts and transactions associated with the accounts. Generally, legacy systems operate within the private network 50.

An ATM services module 54 is also within the exemplary private network 50. The ATM services module 54 can have one or more processors, memory, and a transceiver to communicate with other components inside the network 50 and outside of the network 50. The ATM services module 54 can receive communications from the ATM 10 as well as other ATMs. Communications from the ATM 10 to the ATM services module 54 can be directed over one or more public networks, such as network 56. The network 56 can apply industry standard financial messaging protocols, such as ISO 8583 and ISO 20022. Upon receipt of a communication from the ATM 10, the ATM services module 54 can, for example, forward the communication to the core 52 for approval of a transaction such as a cash withdrawal, for information such an account balance, or for completion of a transaction such as a balance transfer. The ATM services module 54 can further communicate information received from the core 52 to the ATM 10, such as an authorization to dispense currency.

A remote services module 58 is also within the exemplary private network 50. The remote services module 58 can have one or more processors, memory, and a transceiver to communicate with other components. The remote services module 58 can be configured to communicate with computing devices of account holders. Examples of computing devices include desktop computers (such as 70), laptop computers, tablet computers, mobile phones (such as 72), and smart televisions. The remote services module 58 can receive pre-staged transactions from computing devices possessed by users. The pre-staged transactions can be received over one or more public networks, such as networks 60 and 62. One or both of the networks 60, 62 can include a local area network (LAN), a wide area network (WAN), e.g., the Internet, or a combination thereof. One or both of the networks 60, 62 can be wireless in whole or in part, or can be wired. One or both of the networks 60, 62 can be a cellular or mobile network. The remote services module 58 can also be configured to transmit data outside of the private network 50, such as to communicate a confirmation of a pre-staged transaction.

A queuing services module 64 is also within the exemplary private network 50. The queuing services module 64 can have one or more processors, memory, and a transceiver to communicate with other components. The queuing services module 64 can be configured to receive a pre-staged transaction from the remote services module 58 or from the core 52. The queuing services module 64 can receive the pre-staged transaction from the remote services module 58 directly or indirectly. For example, the remote services module 58 can direct the pre-staged transaction to the queuing services module 64 and the queuing services module 64 can direct the pre-staged transaction to the core 52 for approval (direct communication). Alternatively, the remote services module 58 can direct the pre-staged transaction to the core 52 initially for approval and the core 52 can direct the pre-staged transaction to the queuing services module 64 after approval (indirect communication). The core 52 can exchange communications with the queuing services module 64 over the private network 50, which is distinct from the public networks 60, 62. Alternatively, the remote services module 58 can direct the pre-staged transaction to the core 52 initially for approval, the core 52 can communicate approval to the remote services module 58, and the remote services module 58 can direct the pre-staged transaction to the queuing services module 64 (direct communication).

The exemplary system 49 also includes a pre-staging module 66. The exemplary pre-staging module 66 is outside of the private network 50. The exemplary pre-staging module 66 is configured to communicate with queuing services module 64 in a manner that conforms with the requirements and protocols of legacy system(s) operating within the private network 50.

The exemplary pre-staging module 66 has one or more processors, a memory, and a transceiver to communicate with other components. The transceiver of the exemplary pre-staging module 66 is configured to transmit and receive communications over a network, such as network 68. The exemplary queuing services module 64 can communicate pre-staged transactions to the exemplary pre-staging module 66 over the network 68. The network 68 can be a public network, a private network, or a virtual private network. The network 68 can be a cellular/mobile network. The exemplary pre-staging module 66 is configured to store pre-staged transactions in its memory.

The exemplary pre-staging module 66 can also communicate directly with one or more ATMs, such as ATM 10. The exemplary pre-staging module 66 can communicate with the ATM 10 over a network 71. The network 71 can be a cellular/mobile network.

Figure 3:
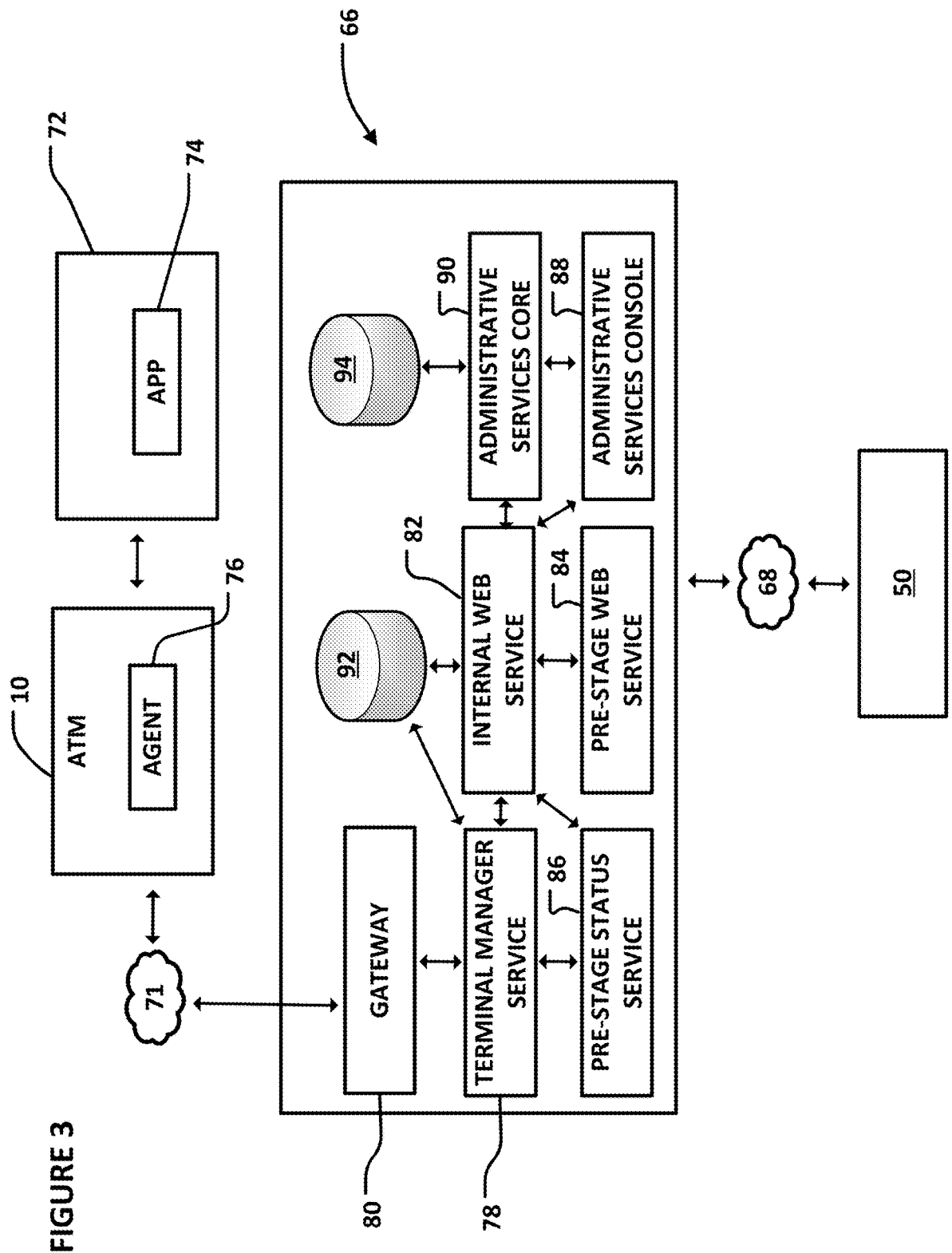
FIG. 3 is a functional block diagram of an exemplary pre-staging module according to one or more implementations of the present disclosure.

FIG. 3 is a functional block diagram of the exemplary pre-staging module 66 and other devices that can interact, directly or indirectly, with the pre-staging module 66 according to one or more implementations of the present disclosure. In the exemplary embodiment, the financial institution operating the private network 50 and the devices communicating therein, can also control, at least partially, an application 74 running on an account holder's smartphone 72. The application 74 can be utilized by the account holder to pre-stage a banking transaction or execute a banking transaction. When pre-staging a transaction, the application 74 can communicate with the remote services module 58. When executing a pre-staged transaction, the application 74 can communicate with the ATM 10, such as, by way of example and not limitation, a QR code displayed on the smartphone 72 and scanned by the scanner 48.

In the exemplary embodiment, the ATM 10 includes an agent 76. The agent 76 can be defined by hardware or software and can be a proxy to control the computing device 12 and thus the ATM 10. The agent 76 can be a proxy of a terminal manager service 78 of the exemplary pre-staging module 66. The terminal manager service 78 can communicate with the agent 76 over the network 71 and through a gateway 80. The terminal manager service 78 can receive, over the gateway 80, data that is input to the ATM 10 and assess the data to determine appropriate further actions, such as the disbursement of currency by the ATM 10. The functionality of the exemplary terminal manager service 78 is discussed further below.

The exemplary gateway 80 is a socket based gateway created through a socket and a mutually authenticated handshake. The exemplary gateway 80 is used as a remote messaging delivery system. For example, the internal subcomponents of the ATM 10 can communicate with each other using a common protocol and over a message communication bus. The commands sent over the gateway 80 can apply the protocol used by the internal subcomponents of the ATM 10. By having the exemplary terminal manager service 78 "speak" the protocol of the internal subcomponents of the ATM 10, the exemplary terminal manager service 78 appears as just another device on the message communication bus and is addressed in the same way as all other devices. The internal subcomponents of the ATM 10 are thus not aware that the exemplary terminal manager service 78 is remote.

The exemplary terminal manager service 78 can act as the driver of the ATM 10 and thus allows for an abstraction of business applications away from the ATM 10. The exemplary terminal manager service 78 can be implemented as a Windows service that is hosted on the pre-staging module 66. The terminal manager service 78 can be a stateless, cloud-based service. This would allow for a 1 to N relationship between the terminal manager service 78 and a plurality of ATMs.

The exemplary pre-staging module 66 also includes an internal web service 82, a pre-stage web service 84, a pre-stage status service 86, an administrative services console 88, an administrative services core 90, a transactions database 92, and a services database 94. The services can be defined by hardware, software or a combination of hardware and software.

Communications emanating from the private network 50 can be received by the pre-stage web service 84. For example, pre-approved, pre-staged banking transactions can be transmitted from the queuing services module 64, over the network 68, and can be received by the pre-stage web service 84. The pre-stage web service 84 can authenticate the sender of communications and direct authenticated communications to the internal web service 82.

The internal web service 82 can receive external communications from the pre-stage web service 84 and process the external communications. For example, an external communication can be a pre-staged financial transaction received from the queuing services module 64 and the internal web service 82 can store the pre-staged financial transaction in the transactions database 92.

The exemplary pre-staging module 66 can be utilized by more than one financial institution system, as shown in FIG. 2. The ATM 10, the private network 50, and the components communicating with one another within the private network 50 define a first financial institution computing system. FIG. 2 shows a second, unnumbered financial institution computing system, in a parallel to the first financial institution computing system, relative to the exemplary pre-staging module 66. The administrative services console 88, administrative services core 90, and a services database 94 can be utilized by different financial institution systems to alter the parameters of control over ATMs by the terminal manager service 78. The exemplary administrative services console 88 can, for example, be defined by a website accessible to each financial institution system utilizing the exemplary pre-staging module 66. The exemplary administrative services console 88 can be utilized to access the administrative services core 90. The exemplary administrative services core 90 can establish parameters under which ATMs are controlled and which can be changed. The chosen values for each parameter can then be stored in the services database 94.

Upon receiving input from an ATM, the terminal manager service 78 may access both the transactions database 92 and the services database 94. For example, if the input corresponds to a pre-staged transaction, the exemplary terminal manager service 78 will access the transactions database 92 to confirm that the pre-staged transaction has been approved by the relevant financial institution system. The exemplary terminal manager service 78 will also access the services database 94 to retrieve and apply parameters for replying to the ATM with commands for proceeding on the transaction request.

The agent 76 can be configured to transmit a communication to the terminal manager service 78 when a pre-staged transaction has been completed. The terminal manager service 78 can direct the communication to the pre-stage status service 86. In response to receiving the communication that the pre-staged transaction has been completed, the pre-stage status service 86 can then update the transactions database 92 so that the pre-staged transaction cannot be completed again. The pre-stage status service 86 can also direct the communication to the queuing services module 64.

FIGS. 2 and 3 demonstrate that, in the exemplary embodiment, the ATM 10 is a relatively small portion of the overall architecture of the system. In fact, the exemplary ATM 10 is utilized as a black-box appliance to perform cash in and cash out transactions. The business logic that drives the ATM 10 can be implemented on a legacy platform, such as by way of example and not limitation, a Common Services Architecture (CSA) developed by Diebold Nixdorf. CSA is a platform built on the Microsoft Azure Pack for Windows Server (it has also been successfully deployed directly to Microsoft Azure), which allows the development and deployment of highly scalable, multi-tenant, service-oriented applications. The legacy platform can be applied directly from within the system 50 when the ATM 10 is engaged for a transaction that is not pre-staged and from the exemplary terminal manager service 78 of the pre-staging module 66 when the ATM 10 is engaged for a pre-staged transaction. Thus, the exemplary pre-staging module 66 does not require changes to legacy systems while also allowing enhanced functionality to the system 49.

Moving the business logic to the server side provides an opportunity for engineering optimizations on the ATM 10. It can also be seen from FIGS. 2 and 3 that the client application (the components operating within the private network 50) can reside anywhere, such as a customer data center, a cloud-based data center, etc. This allows maximum flexibility in client application development.

Figure 4:
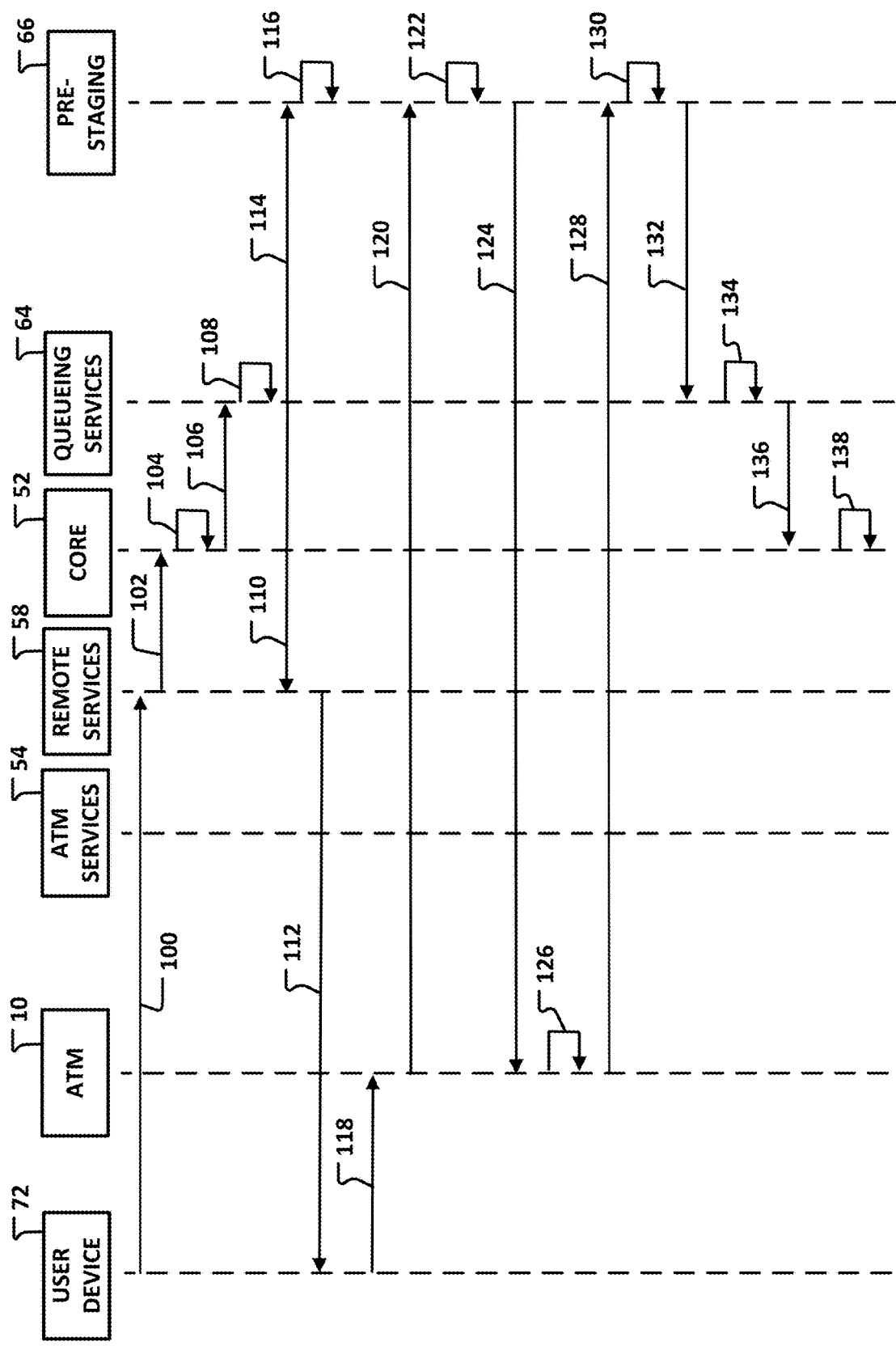
FIG. 4 is a simplified activity diagram according to one or more implementations of the present disclosure.

FIG. 4 is a simplified activity diagram according to one or more implementations of the present disclosure. At 100, the remote services module 58 receives a first input from a computing device possessed by a user, such as the desktop computer 70 or the smartphone 72. The exemplary remote services module 58 is physically remote from the user computing device. The first input can be transmitted over a public network. The desktop computer 70 could be communicating with the remote services module 58 over the internet 62. The smartphone 72 could be communicating with the remote services module 58 over a cellular phone network 60.

The exemplary first input defines a pre-staged financial transaction. The first input can be generated through the use of the app 74. The exemplary first input at least includes details of an account associated with the user and an amount to be withdrawn from the account.

At 102, the remote services module 58 transmits the first input to the financial institution core 52 over the private network 50. The financial institution core 52 includes a memory storing a ledger of the user's account and prior transactions associated with the account. The ledger stored in the memory of the financial institution core 52 also includes details of accounts of other users.

At 104, the financial institution core 52 determines whether or not the pre-staged financial transaction is approved. The financial institution core 52 can approve the pre-staged financial transaction when the user's account holds more than the amount of the pre-staged financial transaction. In one or more embodiments of the present disclosure, the financial institution core 52 can store the first input in memory as a provisional transaction against the user's account. When the pre-staged transaction is consummated, the financial institution core 52 can convert the provisional transaction to a completed transaction.

At 106, the financial institution core 52 communicates a message to the queuing services module 64, over the private network 50, that the pre-staged financial transaction is approved. The communication can include the provisional transaction, which itself includes at least some of the details of the first input. The queuing services module 64 can also include memory. In response to receiving a communication that a pre-staged transaction is approved, the queuing services module 64 can be configured to store the transaction in memory. The queuing services module 64 can also be configured to generate a token associated with the pre-staged transaction. At 108, the queuing services module 64 correlates the token with the account associated with the user. The queuing services module 64 can retain the correlation from the pre-staging module 66 and from other components communicating over the private network 50. Thus, knowledge of the token does not also impart knowledge of the account associated with the token.

At 110, the queuing services module 64 communicates the token to the remote services module 58 over the private network 50. At 112, the remote services module 58 transmits the token outside of the private network 50. The token can be transmitted outside of the private network in one of an email message and a text message. The token can be communicated to the computing device used to generate the pre-staged transaction or to another computing device designated by the account holder.

Generally concurrent with 110 and 112, the queuing services module 64 can transmit a communication to the pre-staging module 66 at 114. The communication includes at least the amount to be withdrawn of the first input and the token. The communication is directed outside of the private network 50, over the network 68. The pre-staging module 66 has a memory in the form of the transactions database 92. At 116, the pre-staging module 66 stores the communication from the queuing services module 64 in the transactions database 92.

The financial institution system then awaits the user to consummate the pre-staged financial transaction. At 118, the ATM 10 receives the token from the user. For example, the app 74 can generate a QR code on the screen of the user's smartphone 76. The data represented by the QR code includes the token. The user can position the screen of the smartphone 72 below the scanner 48. The scanner 48 can scan the QR code and, at 120, the agent 76 can transmit the data represented by the QR code to the pre-staging module 66. The data includes the token and is transmitted over a public network.

Upon receiving the token from the ATM 10, the terminal manager service 78 of the pre-staging module 66 can query the transactions database 92 to confirm that the received token is also saved in the transactions database 92. When the received token is also saved in the transactions database 92, the terminal manager service 78 can retrieve the amount to be dispensed, associated with the token, from the transactions database 92. These actions are referenced in FIG. 4 at 122.

At 124, the terminal manager service 78 of the pre-staging module 66 can transmit to the ATM at least the amount to be withdrawn (dispensed to the user). The transmission can be characterized as an execution directive. The amount can be the only data that is transmitted to enhances security. At 126, the ATM 10 consummates the pre-staged financial transaction in response to receiving the execution directive from the pre-staging module 66 by dispensing currency in the amount to be withdrawn.

When the currency has been dispensed to the user, the ATM 10 can communicate completion of the pre-staged financial transaction. At 128, the terminal manager service 78 of the pre-staging module 66 receives a second input from the ATM 10 indicating completion of the dispensing. The second input includes the token or includes at least some data that correlates to the token. The second input can also include the amount dispensed by the ATM 10.

The terminal manager service 78 directs to the second input to pre-stage status service 86. The pre-stage status service 86 updates the transactions database 92 so that the pre-staged transaction cannot be completed again. These actions are referenced in FIG. 4 at 130. The pre-stage status service 86 also directs the second input to the queuing services module 64 at 132.

Upon receipt of the second input, the queuing services module 64 determines the relevant account based on the token at 134 and confirms that the amount dispensed is identical to the amount that was pre-staged. At 136, the queuing services module 64 transmits, over the private network 50, the second input and the account to the financial core. At 138, the financial core 52 converts the provisional transaction to a completed transaction in response to receiving the account and the second input from the queuing services module 64.

In one or more embodiments of the present disclosure, the ATM 10 can thus dispense currency only in response to the receiving the token without receiving additional information related to the pre-staged transaction and/or without receiving an identity of the person presenting the token to the ATM. Thus, the user can email or text the QR code to another person with sharing his/her account information. This obviates the need for money-wiring services. Also, the system allows transactions to be processed much faster. No personal identification number (PIN) is required of the person presenting the token. This allows a person to pre-stage a transaction that he/she will himself/herself execute in the future with minimal effort. For example, the currency may be withdrawn quickly from an ATM that is located in an area having relatively weak security or relatively high crime.

In one or more embodiments of the present disclosure, additional security can be provided by the system. For example, the queuing services module 64 can be configured to generate a one-time personal identification number (OTPIN) corresponding to the first input, that is distinct from the token. The queuing services module 64 can transmit the OTPIN to the pre-staging module 66 with the at least the amount to be withdrawn of the first input and the token. The pre-staging module 66 can store the OTPIN with the amount to be withdrawn of the first input and the token. The remote services module 58 can transmit the OTPIN outside of the private network 50 separately from the token. The OTPIN can be transmitted in an email message or a text message separately from the token. For example, the token can be sent in an email and the OTPIN can be sent in a text message. The pre-staging module 66 can receive the OTPIN and the token from the ATM 10 when a person attempts consummate the pre-staged transaction. The pre-staging module 66 can be configured to direct the ATM 10 to dispense currency only if the OTPIN and the token are stored in the transactions database 92.

In one or more embodiments of the present disclosure, additional security can be provided by defining time limits for consummating the pre-staged transaction. The pre-staging module 66 can be configured to determine a first time period between the transmitting of the amount to be withdrawn and the token to the pre-staging module 66 and the receiving of the token from the ATM 10. The pre-staging module 66 can be configured to compare the first time period to a predetermined time period. The pre-staging module 66 can be further configured to transmit the command to the ATM 10 to dispense currency only if the first time period is less than the predetermined time period.

The present disclosure provides several technological improvements over existing financial transaction computing systems. The technological improvements include taking advantage of quicker cellular networks as well as avoiding slower legacy systems. The present disclosure allows a financial transaction computing system to break a transaction into sub-steps and apply different levels of security to various sub-steps to increase the speed of execution of a transaction. Also, the present disclosure allows a financial transaction computing system to execute various sub-steps using different networks to increase the speed of execution of a transaction. An initial step, such as pre-staging a transaction, can be performed using relatively greater security protocols applied by legacy systems within private networks. A subsequent step, such as consummating a transaction that has already been considered and approved, can be performed using relatively quicker networks. This reduces the overall time required to complete the transaction. It also allows transactions to be initiated and completed in different geographic locations. For example, initiation of the transaction can be completed at a more secure location while completion can occur rapidly in a second location. Further, it allows a financial institution to "off-load" a portion of the transaction protocol and architecture burden to a third party. The aspect of the transaction requiring a higher level of security can be performed by the financial institution while an aspect that can tolerate a lower security level can be performed outside of the private network. The system can also obviate current systems for transferring funds to others, which typically charge a fee.

It is noted that the various public networks (56, 60, 62, 68, 71, 72) can be the same network or different networks.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein is hereby unconditionally reserved. The use of the word "can" in this document is not an assertion that the subject preceeding the word is unimportant or unnecessary or "not critical" relative to anything else in this document. The word "can" is used herein in a positive and affirming sense and no other motive should be presumed. More than one "invention" may be disclosed in the present disclosure; an "invention" is defined strictly by the content of a patent claim and not by what is written in a detailed description of an embodiment of an invention.

What is claimed is:

1. A method of operating a financial transaction computing system comprising:

receiving, with a remote services module, a first input from a computing device possessed by a user, the remote services module physically remote from the computing device, the first input defining a pre-staged financial transaction and at least including details of an account associated with the user and an amount to be withdrawn from the account;

transmitting, with the remote services module, over a private network, the first input to a financial institution core having a first memory, the first memory storing a ledger of the account and prior transactions associated with the account;

determining, with the financial institution core, that the pre-staged financial transaction is approved;

generating, with a queuing services module after said determining, a token corresponding to the first input;

transmitting, with the queuing services module, over a second network distinct from the private network, at least the amount to be withdrawn of the first input and the token, to a pre-staging module having a second memory and physically remote from the queuing services module;

storing, with the pre-staging module, in the second memory, the at least the amount to be withdrawn of the first input and the token;

transmitting, with the remote services module, the token outside of the private network;

receiving, with the pre-staging module, the token from an automated transaction machine (ATM), over a cellular network, after said transmitting the token outside of the private network, with the remote services module;

retrieving, with the pre-staging module, the at least the amount to be withdrawn of the first input from the second memory in response to receiving the token;

transmitting, with the pre-staging module, over the cellular network, the at least the amount to be withdrawn of the first input to the ATM; and dispensing, with an advanced function dispenser of the ATM, currency in the amount to be withdrawn from the account in response to said transmitting the at least the amount to be withdrawn by the pre-staging module.

2. The method of claim 1 further comprising:
receiving, with the ATM, the token after said transmitting the token outside of the private network by the remote services module and before said receiving the token with the pre-staging module;
transmitting, with the ATM, the token to the pre-staging module after said receiving the token with the ATM and before said receiving the token with the pre-staging module; and
wherein said dispensing is further defined as: dispensing, with the ATM, the currency in response to said receiving the token with the ATM and also in response to said transmitting the at least the amount to be withdrawn by the pre-staging module to the ATM, without the ATM receiving either of additional information related to the pre-staged transaction and an identity of a person from whom the ATM received the token.

3. The method of claim 1 wherein said transmitting the at least the amount to be withdrawn with the pre-staging module is further defined as:
transmitting, with the pre-staging module that is outside of the private network, only the amount to be withdrawn of the first input to the ATM.

4. The method of claim 1 wherein said transmitting the at least the amount to be withdrawn of the first input and the token to the pre-staging module with the queuing services module is further defined as:
transmitting, with the queuing services module, only the amount to be withdrawn and the token to the pre-staging module.

5. The method of claim 1 wherein said generating the token with the queuing services module further comprises:
correlating, with the queuing services module, the token with the account associated with the user; and
retaining, with the queuing services module, the correlation between the token and the account from the pre-staging module.

6. The method of claim 5 wherein said retaining is further defined as:
retaining, with the queuing services module, the correlation between the token and the account from the pre-staging module and from the private network.

7. The method of claim 1 further comprising:
storing, in the first memory, the first input as a provisional transaction against the account; and
transmitting, with the financial core over the private network, the provisional transaction to the queuing services module, wherein the queuing services module executes said generating in response to said transmitting the provisional transaction by the financial core over the private network.

8. The method of claim 7 further comprising:
receiving, at the pre-staging module, a second input from the ATM indicating completion of said dispensing;
transmitting, with the pre-staging module, over one of the second network, the second input and the token to the queuing services module;
correlating, with the queuing services module, the token to the account;

transmitting, with the queuing services module, over the private network, the second input and the account to the financial core; and
converting, with the financial core, the provisional transaction to a completed transaction in response to receiving the account and the second input.

9. The method of claim 1 wherein said receiving the first input from the computing device possessed by the user is further defined as:
receiving, with the remote services module, the first input over a first public network.

10. The method of claim 9 wherein said transmitting the at least the amount to be withdrawn of the first input and the token to the pre-staging module is further defined as:
transmitting, with the queuing services module, at least the amount to be withdrawn of the first input and the token to the pre-staging module over the second network defined by a virtual private network.

11. The method of claim 9 wherein said transmitting the at least the amount to be withdrawn of the first input and the token to the pre-staging module is further defined as:
transmitting, with the queuing services module, at least the amount to be withdrawn of the first input and the token to the pre-staging module over the second network defined by a second public network.

12. The method of claim 9 wherein said receiving the token with the pre-staging module is further defined as:
receiving, with the pre-staging module, the token from the ATM over a third public network.

13. The method of claim 9 wherein said transmitting the at least the amount to be withdrawn of the first input to the ATM is further defined as:
transmitting, with the pre-staging module, the at least the amount to be withdrawn of the first input to the ATM over the first public network.

14. The method of claim 1 further comprising:
generating, with the queuing services module, a one-time personal identification number (OTPIN) after said determining, corresponding to the first input, and distinct from the token;
transmitting, with the queuing services module, the OTPIN to the pre-staging module with the at least the amount to be withdrawn of the first input and the token;
storing, in the second memory, the OTPIN with the at least the amount to be withdrawn of the first input and the token;
transmitting, with the remote services module, the OTPIN outside of the private network separately from the token;
receiving, with the pre-staging module, the OTPIN from outside of the private network with the token, from the ATM, after said transmitting the OTPIN outside of the private network; and
retrieving, with the pre-staging module, the at least the amount to be withdrawn of the first input from the second memory in response to receiving the token and the OTPIN.

15. The method of claim 14 wherein:
said transmitting the OTPIN outside of the private network is further defined as transmitting, with the remote services module, the OTPIN outside of the private network in a first of an email message and a text message; and
said transmitting the token outside of the private network is further defined as transmitting, with the remote services module, the token outside of the private network in a second of an email message and a text message, the second of an email message and a text message opposite of the first of an email message and a text message.

16. The method of claim 1 further comprising:

determining, with the pre-staging module, a first time period between said transmitting the at least the amount to be withdrawn of the first input and the token to the pre-staging module and said receiving the token from outside of the private network with the pre-staging module;

comparing, with the pre-staging module, the first time period to a predetermined time period; and wherein said transmitting the at least the amount to be withdrawn to the ATM is further defined as: transmitting, with the pre-staging module, the at least the amount to be withdrawn of the first input to the ATM only if the first time period is less than the predetermined time period.

17. The method of claim 1 wherein said transmitting the token outside of the private network is further defined as:

transmitting, with the remote services module, the token outside of the private network in one of an email message and a text message.

\* \* \* \* \*